United States Patent [19]

Orndorff, Jr. et al.

[11] Patent Number: 4,738,467
[45] Date of Patent: Apr. 19, 1988

[54] SUSPENSION SYSTEM

[75] Inventors: Roy L. Orndorff, Jr., Kent; John A. Haggerty, Norton, both of Ohio

[73] Assignee: The B.F. Goodrich Company, Akron, Ohio

[21] Appl. No.: 23,325

[22] Filed: Mar. 9, 1987

[51] Int. Cl.[4] .............................................. B60G 11/20
[52] U.S. Cl. ................................... 280/721; 280/6 R; 280/711; 267/280
[58] Field of Search ............... 280/6 R, 6 H, 6.1, 702, 280/721, 711; 267/280

[56] References Cited

U.S. PATENT DOCUMENTS

| | | | |
|---|---|---|---|
| 3,336,021 | 8/1967 | Kramer | 267/1.5 |
| 3,770,291 | 11/1973 | Kramer | 267/57.1 A |
| 4,379,572 | 4/1983 | Hedenberg | 280/711 |
| 4,390,187 | 6/1983 | Maeda | 280/6 R |
| 4,453,725 | 6/1984 | Kuwana et al. | 280/6 R |
| 4,466,625 | 8/1984 | Kondo et al. | 280/6 R |

Primary Examiner—Richard A. Bertsch
Attorney, Agent, or Firm—Joseph Januszkiewicz

[57] ABSTRACT

A suspension system for a vehicle which maintains the chassis at a constant height above the axle under varying conditions of load. Torsion spring means are employed in conjunction with a support beam that is secured to the chassis. One primary torsion spring has its external shell connected to the axle housing of the vehicle while the remaining torsion spring means has a radially disposed plate means in alignment with a radially disposed plate means extending from the shell of the one primary torsion spring. An inflatable bladder positioned between the plates is controlled by control means which maintains the chassis at such constant height by pressurizing the bladder to a pressure to maintain such height under variable conditions of load.

7 Claims, 8 Drawing Sheets

SUSPENSION SYSTEM

BACKGROUND OF THE INVENTION

The present invention relates to a suspension system for a vehicle and more particularly to a suspension system incorporating constant height characteristics for particular use on buses as well as other vehicles.

It is desirable to provide suspension systems with sufficient carrying capacity and resiliency to permit the vehicle to provide a quality ride when the vehicle is fully loaded or when it is empty. The prior art in this field has employed auxiliary springs that the actuated for employment for full load carrying capacity. Various combinations of elastomeric springs and mechanical springs have been employed however in many instances the space requirements are such as to complicate their installation and use. The present invention is directed to a suspension system that employs torsion springs that are operative to automatically maintain a constant height level of the vehicle chassis under all conditions of load with a simpler means that is easy to service while permitting its operation under low pressure which is readily available on most vehicles.

SUMMARY OF THE INVENTION

The present invention provides a suspension system for a vehicle such as buses which maintain the chassis at a constant height above the axles under the various load conditions including empty as well as full load. The suspension system employs a support beam with at least three torsion springs encompassing the beam and secured thereto. The primary torsion spring has it's external shell secured to the axle housing of the vehicle while the respective ends of the shaft are secured via brackets to the vehicle chassis. Adjusting means may be employed with such brackets and the ends of the shaft to preload the primary torsion spring. An inflatable bladder is positioned between the primary torsion spring and the remaining torsion springs that are selectively pressurized to maintain the chassis at a constant height. Control means are provided to assure the pressurization of the bladder under predetermined conditions of operation.

DETAILED DESCRIPTION

Figure 1:
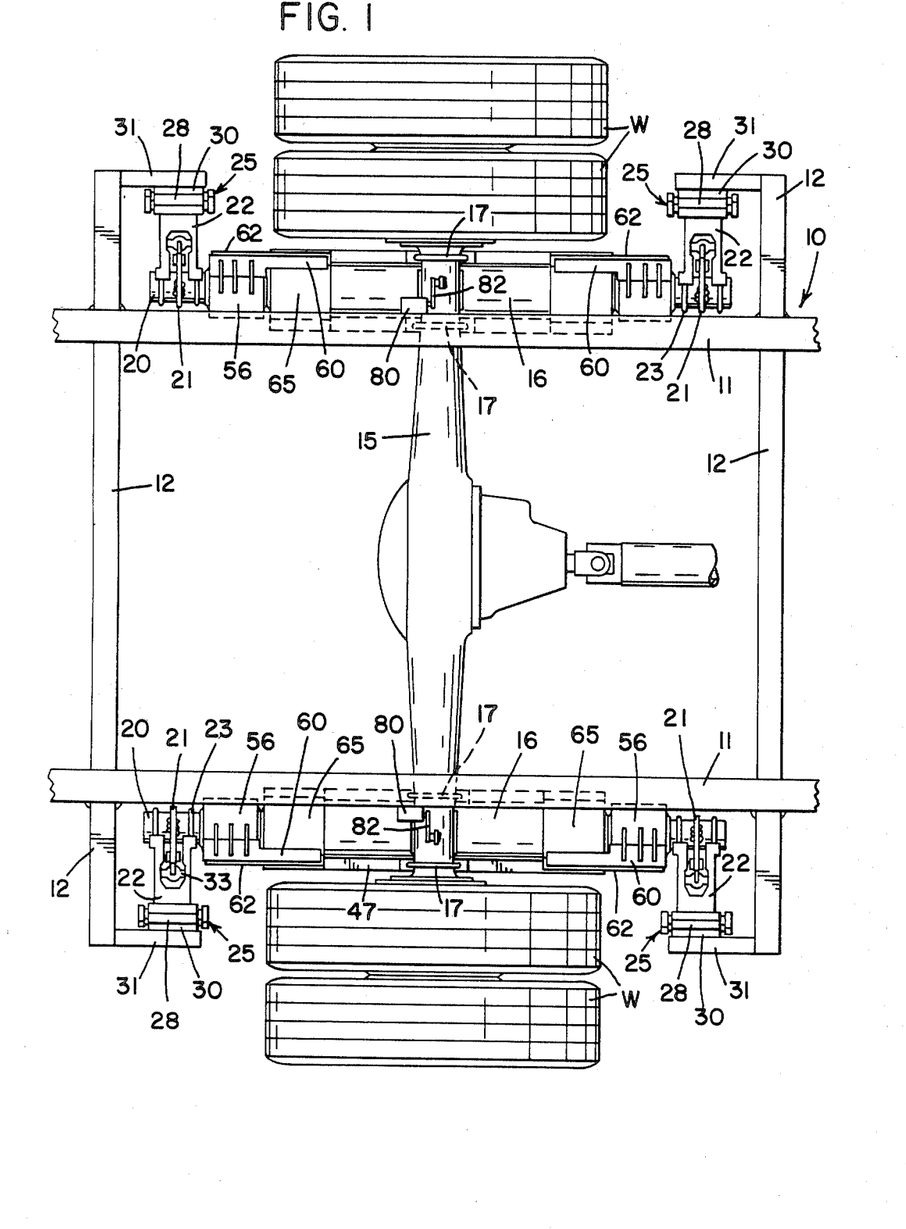
FIG. 1 is a plan view of a vehicle suspension constructed in accordance with and embodying the invention.
Figure 2:
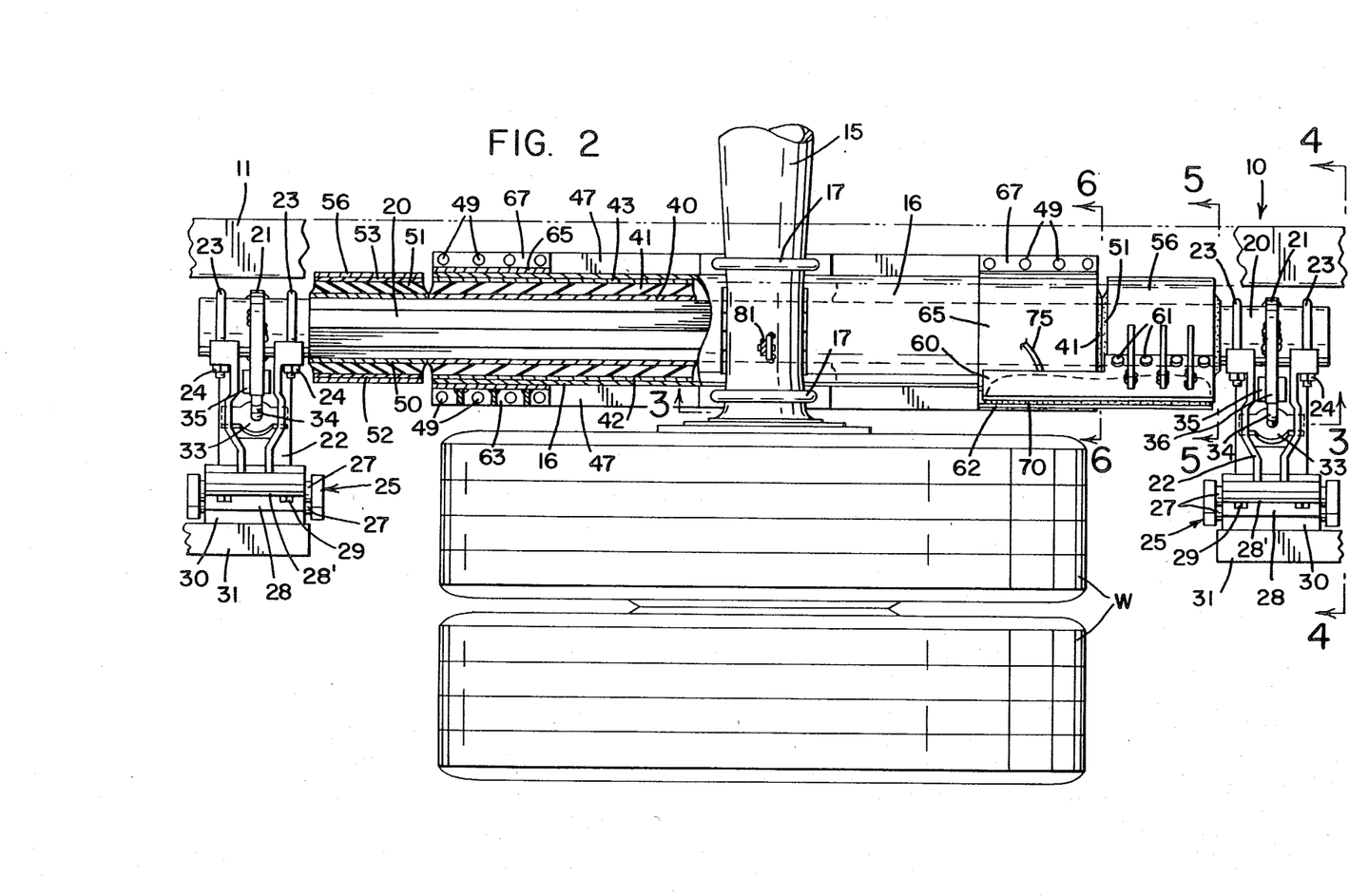
FIG. 2 is an enlarged plan view partly in section of the suspension system shown in FIG. 1 of one side end of the vehicle.

Referring now to the drawings, wherein like reference numerals designate like or corresponding parts throughout the several views, there is shown in FIGS. 1 and 2 a vehicle frame 10 having longitudinal members 11 and transverse members 12. Pairs of wheels W are attached at each end of a driving axle 15 which as shown in FIG. 1 is suspended on the vehicle frame between the transverse members 12.

Figure 4:
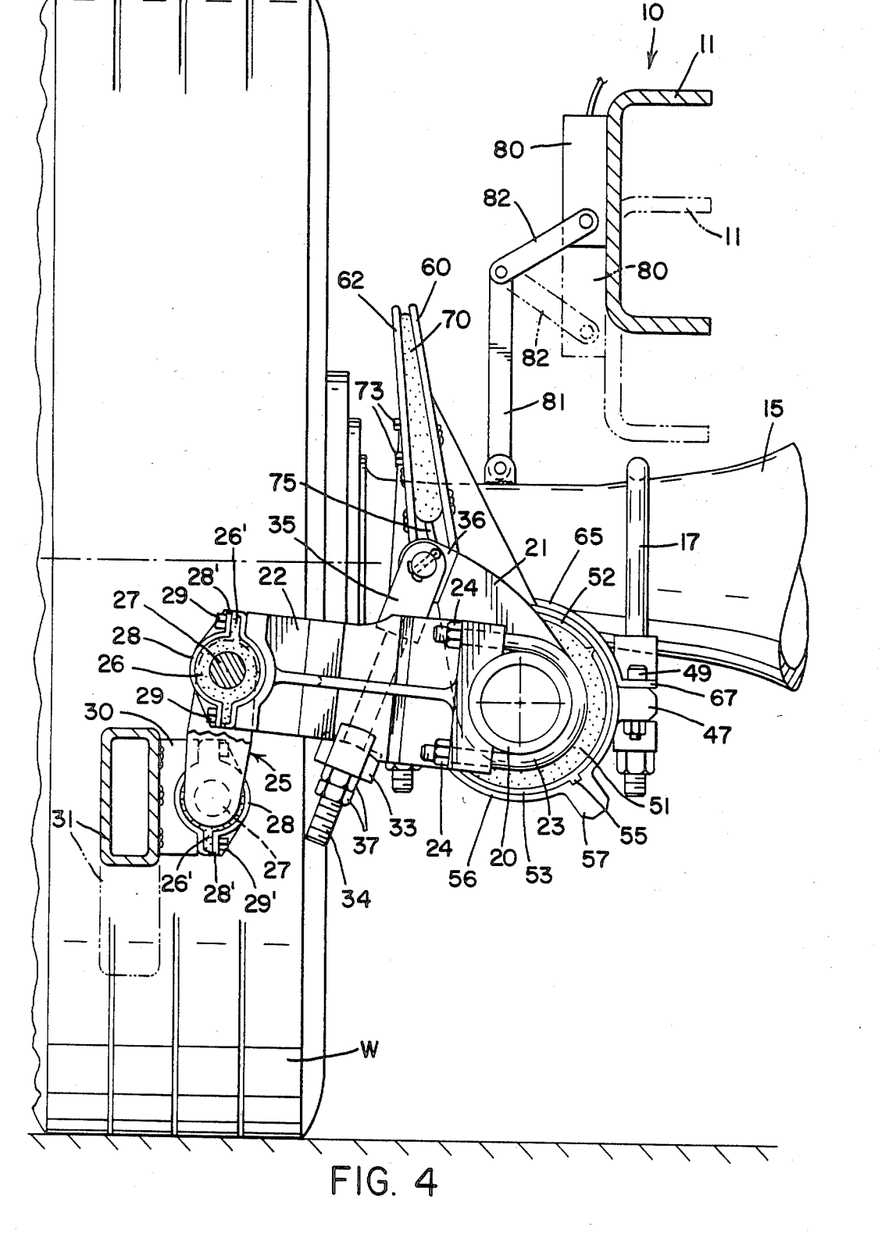
FIG. 4 is a front elevational view partly in section of the suspension system taken on line 4—4 of FIG. 2.

A cylindrical primary housing 16 is rigidly attached to the axle 15 by U-bolts 17. Located within housing 16 is a longitudinally extending support beam or shaft 20. Shaft 20 is octagonal shaped except being rounded on its respective ends. As seen in FIGS. 2 and 4, the respective ends of shaft 20 have welded to them arm members 21. U-shaped bracket 22 (FIG. 2) is connected to each end of shaft 20 by U-bolts 23 which have their respective threaded ends extending through suitable bores in the one end portion of each bracket 22 and are secured thereto by nuts 24. The other end portion of each bracket 22 is recessed and connected to respective shackles 25 (FIG. 4). Each shackle 2 has a pair of spaced shafts 27 that receive an elastomeric annulus member 26. Each elastomeric member 26 has a pair of opposed projections 26'. Shafts 27 have their exterior surfaces adhered to the elastomeric annulus members 26. The outer peripheral surfaces of the annulus members 26 are adhered to semi-cylindrical cap members 28. Semi-cylindrical cap members 28 have extensions 28' that are adhered or bored to elastomeric projections 26' of the elastomeric members 26. Upper cap members 28 are connected to the bracket 22 with bolts 29 extending through the respective extensions 28' of the semi-cylindrical members 28. The lower semi-cylindrical members 28 as seen in FIG. 4 are clamped and connected to flanges 30 that are welded to the chassis frame member 31 with bolt 29'. Chassis frame member 31 is in turn connected to transverse members 12 of vehicle frame 10.

Extending transversely across the bottom portion of each U-shaped bracket member 22 is a clamp member 33 with a central bore that receives the threaded end of a clevis 34. The upper bifurcated end 35 of clevis 34 receives the upper reduced end portion 36 of arm member 21. Clamp member 33 is abuttingly engaged with bracket member 22 by threadedly mounting nuts 37 onto the threaded end of clevis 34.

Figure 6:
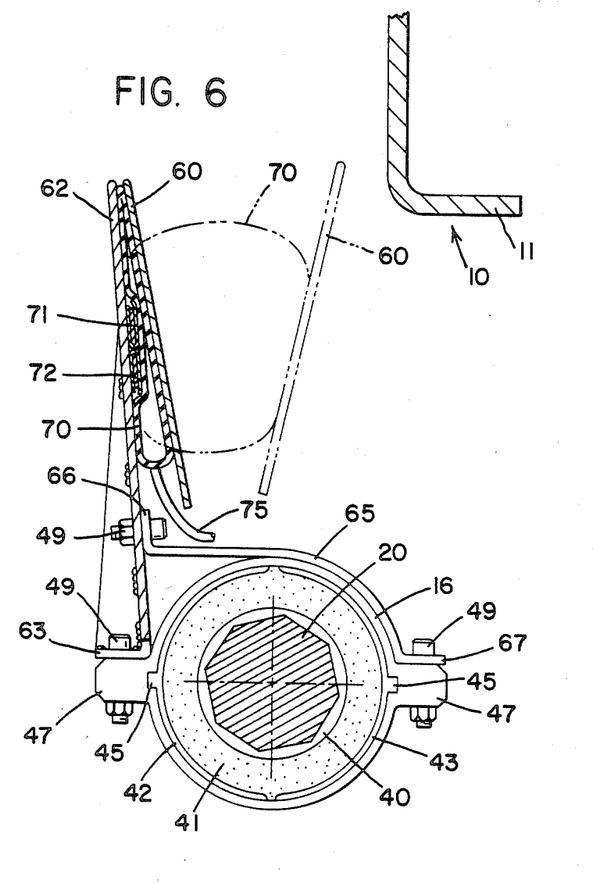
FIG. 6 is a cross sectional view of the adjusting means taken on line 6—6 of FIG. 2.

As seen in FIGS. 2 and 6 a pair of inner hollow shafts 40 have axially aligned octagonal inner bores to slidably receive the support beam or shaft 20. The hollow shafts 40 have a rounded outer periphery for receiving a longitudinally disposed sleeve or annulus of elastomeric material 41 that will define with other members a torsilastic spring or springs. Each elastomeric sleeve 41 is bonded to the outer periphery of the inner hollow shaft 40 (there being two sleeves 41 and two shafts 40). The outer surface of each elastomeric sleeve of elastomeric annulus 41 is bonded to the inner periphery of a pair of semi-cylindrical half shells 42 and 43. The annular elastomeric sleeve 41 which operates as a spring element is molded and vulcanized in the usual way in the space between the shell halves 42 and 43 and the inner hollow shaft 40 and firmly adhered, bonded and secured thereto. A key 45 is formed on the external surface of each shell half 42 and 43 midway along its annular surface. The keys 45 are received by keyways in an outer housing 16 which has two spaced abutments 47.

Slidably received by the respective outermost ends of the beam or shaft 20, adjacent to the rounded ends of such shaft 20, is an inner hollow shaft 50. Hollow shaft 50 has an octagonal bore. Such inner shaft 50 has a rounded peripheral surface for receiving a longitudinally disposed sleeve or annulus of elastomeric material 51. Such shaft 50 lies along a circumferential plane that is coincident with the hollow shaft 40. The elastomeric sleeve 51 is bonded to the outer peripheral surface of the inner hollow shaft 50. The outer surface of each elastomeric sleeve 51 is bonded to the inner periphery of a pair of semi-cylindrical half shells 52 and 53. The annular elastomeric sleeve 51 that operates as a spring element is molded and vulcanized in the usual way in the space between the shell halves 52 and 53 and the hollow shaft 50 and secured thereto as by bonding. A key 55 is formed on the external surface of each shell half 52 and 53 midway along its annular surface. The keys 55 are received by keyways in an outer shell 56 which has two spaced abutments 57. The outer shell 56 defines a secondary housing.

Figure 7:
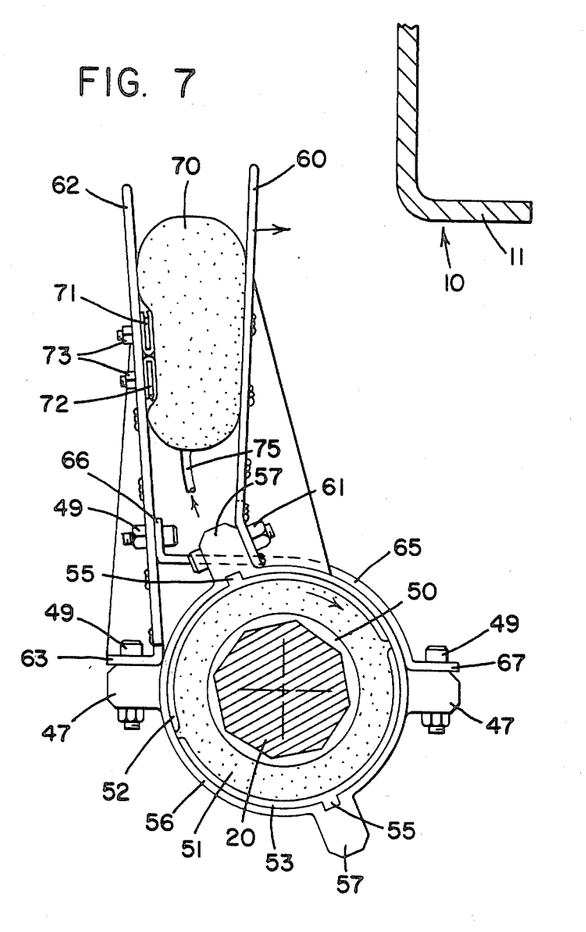
FIG. 7 is a cross sectional view of the adjusting means taken similar to FIG. 5 when the suspension system is under a partial load.
Figure 8:
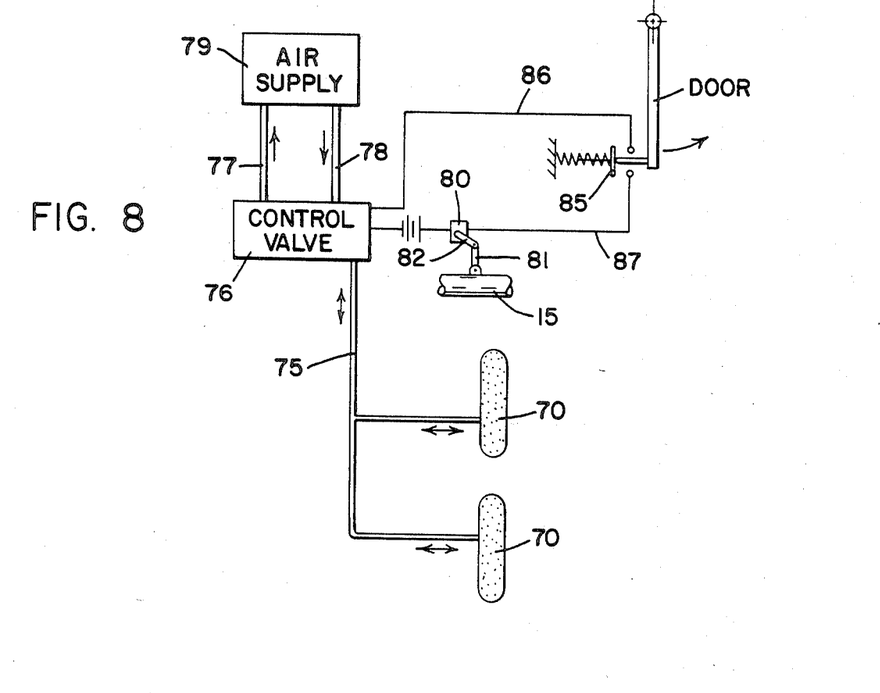
FIG. 8 is a schematic view of the controls for the suspension system.

A rectangular shaped plate member or paddle 60 is secured by a series of bolts 61 to one of the spaced abutments 57 on outer shell 56 (only one will be described, there being two paddles 60, one on each end of the secondary housing 56). The one end of cylindrical housing 16 adjacent to paddle 60 as seen in FIG. 1 and 6 has a paddle 62 with a flanged portion 63 secured to an abutment 47 by the series of bolts 49. An arcuate bracket 65 has one flanged portion 66 secured to paddle 62 and its other flanged portion 67 secured to one of the abutments 47 by bolts 49 (only one paddle 62 was described, there being one paddle on each end of housing 16). Located between the respective paddles 60 and 62 is an inflatable bladder 70 suitably retained therebetween as by straps 71 and 72 (FIG. 5) molded onto the bladder and provide means for securing the bladder to the paddle 62 via bolts 73. Bladder 70 is inflatable from a suitable source via conduit 75. Conduit 75 is connected to a control valve 76 which upon actuation will inflate bladder 70 to a pressure determined by control valve 76. Pressurized air is supplied via control valve 76 via conduits 77 and 78 from a reservoir 79. The control means for actuating the control valve 76 includes a micro-switch 80 mounted on frame member 11 in vertical alignment with axle 15. A vertically extending actuating leverl 81 (FIG. 4) is mounted on axle 15 with an actuating link 82 pivotally interconnecting lever 81 and a rotative switch member in micro-switch 80. Relative vertical movement between the axle 15 and frame member 11 effects a rotation of actuating link 82 which in turn determines the rotative position of the potentiometer type control within micro-switch 80 which in turn determines the degree of pressurization of the bladder 70. Such micro-switch controls are old and well known in the art. The ability of micro switch 80 to effect actuation of control valve 76 is dependent on contact 85 to interconnect conductor 86 and 87. Contact 85 in its normal condition is open and is closed by the opening of the vehicle door that permits access to and from the vehicle. Thus, the control system is operative only during the period of time that the vehicle door which controls contact 85 is open wherein the micro-switch 80 can actuate control valve 76 which then pressurizes bladder 70 which in turn raises or lowers the chassis frame member 11 relative to axle 15 since the respective paddles 60 and 62 can move from the position shown in FIGS. 5 and 6 to the position shown in FIG. 7 thereby rotating the secondary housing 56 relative to the primary housing 16. (Although FIG. 8 discloses only two bladders 70, there are four bladders 70, as disclosed by FIG. 1. For convenience only two bladders are shown.)

Figure 3:
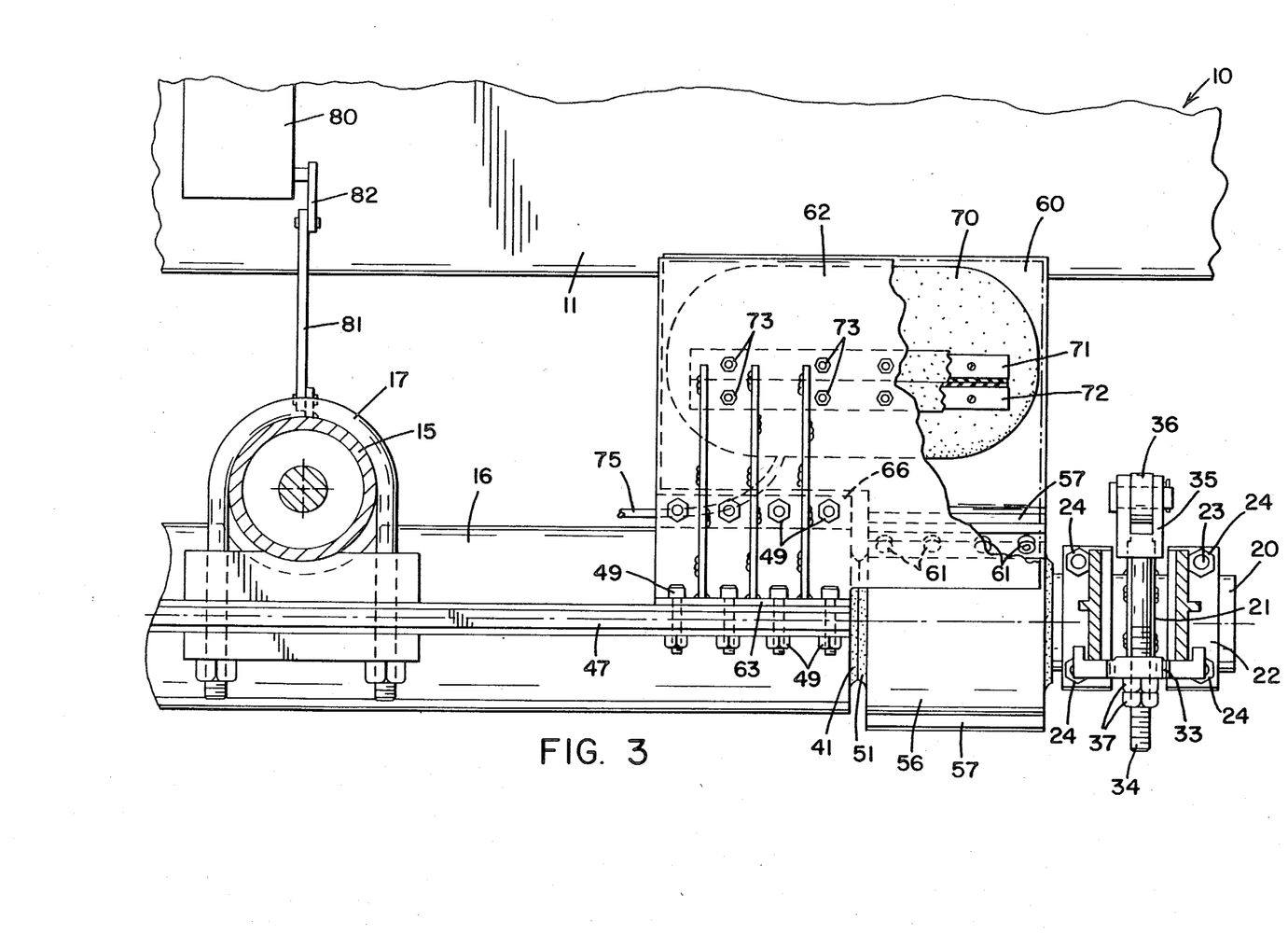
FIG. 3 is a side elevational view partly in section taken on line 3—3 of FIG. 2 and shows the torsion spring and adjusting means for the suspension system.
Figure 5:
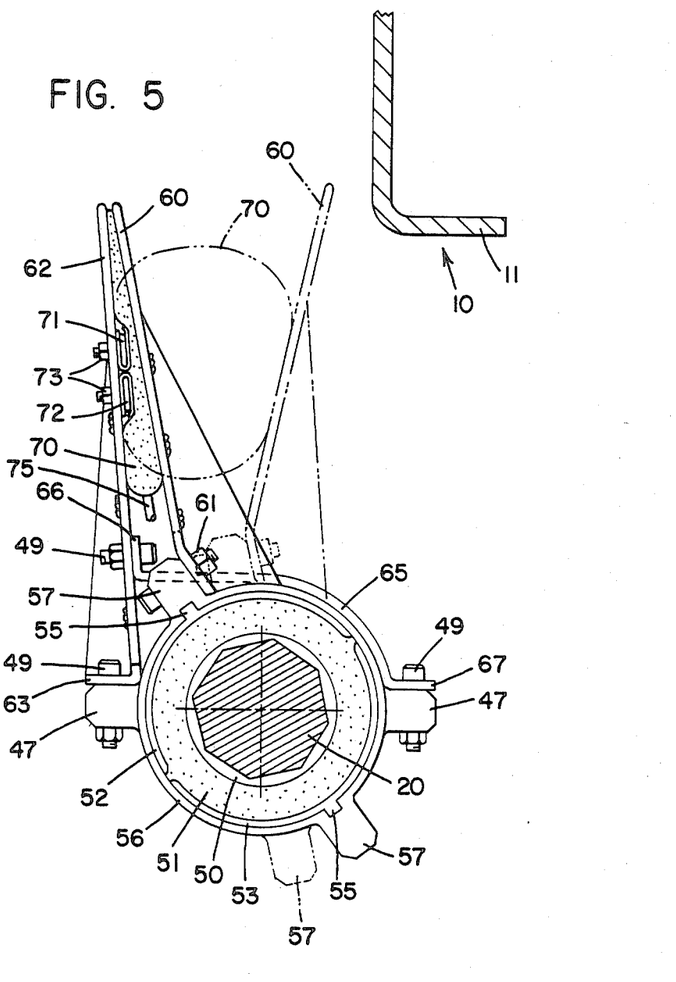
FIG. 5 is a cross sectional view of the adjusting means taken on line 5—5 of FIG. 2 when the suspension system is under an empty load.

In the operation of the suspension system described, as the wheel W is moved vertically by encountering irregular surfaces by the vehicle, the movement of the wheel and axle causes shaft 20 to rotate with respect to the outer shell of the primary housing 16 by virtue of shaft 20 being attached to the vehicle frame 11 via the end portions of such shaft as seen in FIG. 4 while the primary housing 16 is itself attached to the axle 15 via U-bolts 17 as depicted by FIGS. 2 and 3. The rotation of shaft 20 relative to primary housing 16 is resiliently resisted by the elastomeric sleeve 41. The amount of resistance between these members may be adjusted by adjusting the length of the clevis 34 which in turn will adjust the rotative position of arm member 21 which is welded to shaft 20 as depicted by FIG. 3. Such rotation or pivoting of shaft 20 relative to the outer shell or the primary housing 16 will provide a static preloading of the elastomeric annulus 41. Such primary housing with its axially spaced elastomeric sleeves 41 and their respective half shells 42 and 43 and their bonding to the shaft 20 may be treated as a single torsion spring. Such primary housing 16 is recessed to provide means for connecting the axle housing 15 thereto via U-bolts 17 as seen in FIG. 3. Assuming an empty vehicle such that the chassis of such vehicle is in its uppermost position as depicted by frame member 11 and 31 in FIG. 4. With the door of such vehicle in an open condition and the vehicle stopped, contact 85 will close and permit the micro-switch 80 to send a predetermined signal to control valve 76 based on the rotative position of actuating link 82 which in turn will pressurize bladder 70 to a predetermined pressure. In an empty condition of the vehicle, no signal is sent and the frame member 11 remains at its given condition as shown by FIG. 4. In the event such vehicle becomes fully loaded, wherein the weight of the vehicle causes the frame member 11 to assume the position shown in phantom lines in FIG. 4, then actuating link 82 will be pivoted from the full line condition shown in FIG. 4 to the position shown in phantom lines, which condition send a signal to the control valve 76 to permit greater pressurization of the bladder 70 than if the vehicle were only partially loaded. As bladder 70 is inflated by such pressurized fluid from the reservoir 79, bladder 70 will move the relative distance between the paddles 60 and 62 to their fullest extent as shown in FIGS. 5 and 6. This reaction between the paddles is reflected directly to respective primary housings 16 and the secondary housing 56 to which these paddles 60 and 62 are connected to. Such reaction between the respective housings is such as to raise the frame member 11 back to its original position as depicted in FIG. 4 by the solid lines. Since the primary housing 16 is rigidly attached to the axle 15 which is supported by the wheels on the ground, only the secondary housings and their respective paddles rotate thus raising the chassis to maintain the constant height as depicted by FIG. 4. Any loading of the vehicle less than full or more than empty will determine the rotative position of the actuating link 82 in the micro-switch and corresponding determine the pressure in the bladder 70, thus maintaining the constant height of the vehicle regardless of load. Once the door of the vehicle is closed, switch or contact 85 is opened and the pressurized bladder 70 is locked in its pre-set condition by control valve 76. Under these conditions, when such vehicle is traversing uneven terrain the relative movement of the chassis to the axle 15 does not affect the control valves' input into bladder 70 as the control circuit is disabled.

Various modifications are contemplated and may obviously be resorted to by those skilled in the art without departing from the described invention, as hereinafter defined by the appended claims, as only a preferred embodiment thereof has been disclosed.

We claim:

1. A suspension system for a vehicle comprising
   a support chassis for such vehicle,
   an axle means extending transversely of such vehicle for supporting wheels, an axle housing encompassing said axle means,
   a support shaft adjacent one of said wheels of such vehicle and extending at right angles to the axle of said wheels, bracket means connected to the respective ends of said shaft and said support chassis for such vehicle,
   at least three torsion springs non-rotatably mounted on said shaft, each of said torsion springs having an annulus of elastomeric material, each torsion spring having outer housing means in a non-rotative condition relative thereto, each of said torsion springs having said annulus of elastomeric material as the yieldable member between said shaft means and said outer housing means, one of said housing means defining a primary housing connected to said axle housing for cooperative coaction with said bracket means to provide relative movement between said chassis and said axle housing as resisted by the resilient deflection of said elastomeric annulus of said primary housing, said connection of said ends of said shaft means to said chassis having an adjusting means for varying the angular relationship of said primary housing to said shaft means in response to the resilient deflection of said elastomeric annulus between said shaft and said primary housing,
   said primary housing having a pair of axially spaced plate members integral therewith and extending outwardly therefrom,
   the remaining ones of said housing means defining a pair of secondary housings,
   each of said secondary housings having a plate member integral therewith and extending outwardly therefrom and in alignment with said plate members of said primary housing,
   an inflatable member positioned between the plate members of said secondary housings and said plate members of said primary housing, and means for pressurizing said inflatable means for pivoting said plate members of said secondary housing relative to said plate members of said primary housings to maintain a predetermined relative vertical position of said chassis relative to said axle housing.

2. A suspension system as set forth in claim 1 wherein a control means responsive to the loading of said chassis is selectively operable to actuate said pressurizing means for inflating said inflatable means to a predetermined pressure.

3. A suspension system as set forth in claim 2 wherein said control means has a normally open switch that is operative to actuate said pressurizing means only during closing of said switch.

4. A suspension system as set forth in claim 3 wherein said vehicle has a door for egress and ingress, and said normally open switch is closed in response to the opening of said door.

5. A vehicle suspension system having a chassis for supporting the weight of a vehicle, said vehicle having at least a pair of longitudinally spaced axles; each axle extending transversely of said chassis, the end of said axles supporting wheels; each axle journaled in an axle housing;
   support shafts adjacent the respective ends of one of said axles and extending in a direction normal to said axles;
   each support shaft having a first torsion spring means non-rotatably mounted thereon;
   each of said first torsion spring means having elastomeric sleeve means encompassing said shafts; each of said sleeves securely fastened to said shaft that said sleeve encompasses; an outer shell defining a primary housing that encompasses each of said sleeve means fastened thereto; said primary housings are secured to said axle housings of said one axle;
   each of said shafts having a pair of axially spaced torsion springs that are mounted to either side of said primary housing; said axially spaced torsion springs encompass said shafts; each of said axially spaced torsion springs have an outer shell and an elastomeric annulus; said outer shells of said axially spaced torsion springs defining secondary housings; said elastomeric annulus of said pair of axially spaced torsion springs define pairs of secondary elastomeric annuluses which are encompassed by and secured to said secondary housings; each of said secondary elastomeric annuluses are secured to said shafts,
   each of said secondary housings having a radially extending plate means, each primary housing having a pair of axially spaced radially extending plate means in alignment with said radially extending plate means of said secondary plate means,
   inflatable means located between said aligned plate means of said primary and secondary housings, control means operative on actuation to selectively inflate said inflatable means to selectively raise or lower the relative vertical position of said chassis to said axle housing.

6. A vehicle suspension system as set forth in claim 5 wherein said control means are operatively interconnected between said chassis and said axle housing that is responsive to the distance therebetween to maintain said distance under different load conditions.

7. A vehicle suspension system as set forth in claim 6 wherein said control means includes a control valve that is operative upon actuation to selectively pressurize said bladder to a predetermined pressure.

* * * * *